US007649071B2

(12) United States Patent
Schlitzer et al.

(10) Patent No.: US 7,649,071 B2
(45) Date of Patent: *Jan. 19, 2010

(54) # BRANCHED POLYSILOXANE COMPOSITION

(75) Inventors: David S. Schlitzer, Ballston Spa, NY (US); John P. Banevicius, Clifton Park, NY (US)

(73) Assignee: Momentive Performance Materials Inc., Albany, NY (US)

( * ) Notice: Subject to any disclaimer, the term of this patent is extended or adjusted under 35 U.S.C. 154(b) by 383 days.

This patent is subject to a terminal disclaimer.

(21) Appl. No.: 11/515,446

(22) Filed: Sep. 1, 2006

(65) Prior Publication Data

US 2008/0058491 A1 Mar. 6, 2008

(51) Int. Cl.
*C08G 77/12* (2006.01)
*C08G 77/20* (2006.01)

(52) U.S. Cl. .......................................... 528/31; 528/32

(58) Field of Classification Search ....................... None
See application file for complete search history.

(56) References Cited

U.S. PATENT DOCUMENTS

| | | | | |
|---|---|---|---|---|
| 4,482,670 | A | 11/1984 | Saam et al. | |
| 4,554,338 | A | 11/1985 | Wengrovias | |
| 4,956,436 | A | 9/1990 | Letoffe et al. | |
| 4,987,169 | A | 1/1991 | Kuwata et al. | |
| 5,036,117 | A | 7/1991 | Chung et al. | |
| 5,213,899 | A | 5/1993 | Lucas | |
| 5,227,081 | A | 7/1993 | Sawa et al. | |
| 5,399,614 | A | 3/1995 | Lin et al. | |
| 5,418,001 | A | 5/1995 | Uken | |
| 5,489,479 | A | 2/1996 | Lucas et al. | |
| 5,625,023 | A | 4/1997 | Chung et al. | |
| 5,654,362 | A | 8/1997 | Schulz, Jr. et al. | |
| 5,698,655 | A | 12/1997 | Chung et al. | |
| 5,760,116 | A | 6/1998 | Kilgour et al. | |
| 5,817,729 | A | 10/1998 | Wengrovius et al. | |
| 5,880,210 | A | 3/1999 | Schulz, Jr. et al. | |
| 5,929,162 | A | 7/1999 | Horne et al. | |
| 5,929,164 | A | 7/1999 | Zhang | |
| 5,977,280 | A | 11/1999 | Kadlec | |
| 5,998,542 | A | 12/1999 | Horne et al. | |
| 6,355,724 | B1 | 3/2002 | LeGrow et al. | |
| 6,423,322 | B1 | 7/2002 | Fry | |
| 6,489,407 | B1 | 12/2002 | Clark et al. | |
| 6,586,535 | B1 | 7/2003 | Clark et al. | |
| 6,727,338 | B1 | 4/2004 | Kilgour et al. | |
| 6,759,094 | B2 | 7/2004 | Herzig et al. | |
| 6,764,717 | B2 | 7/2004 | Herzig et al. | |
| 6,774,201 | B2 | 8/2004 | Kilgour et al. | |
| 6,805,914 | B2 | 10/2004 | Clark et al. | |
| 6,887,949 | B2 | 5/2005 | Kilgour et al. | |
| 6,936,686 | B2 | 8/2005 | Awad | |
| 6,956,096 | B2 | 10/2005 | Herzig et al. | |
| 7,019,098 | B2 | 3/2006 | Hupfield | |
| 7,135,513 | B2 * | 11/2006 | Lautenschlager et al. | 524/268 |
| 7,238,755 | B2 * | 7/2007 | Herzig et al. | 525/477 |
| 2008/0058479 | A1 | 3/2008 | Schlitzer | |

FOREIGN PATENT DOCUMENTS

WO WO 2004/009678 * 1/2004

OTHER PUBLICATIONS

Http:/www.bcconverting.com/content/8techtips/index4.htm (4 pages).

* cited by examiner

*Primary Examiner*—Marc S Zimmer
(74) *Attorney, Agent, or Firm*—Dale L. Carlson; Wanli Wu; Wigin and Dana LLP

(57) ABSTRACT

The invention relates to branched polysiloxane compositions resulting from copolymerizing under hydrosilylation conditions a component mixture comprising (a) one or more organosilicon compounds containing at least two unsaturated hydrocarbon functional groups per molecule, and (b) one or more silylhydride-containing compounds containing at least two silylhydride functional groups per molecule, with the provision that (i) at least one component (a) or (b) contains at least three functional groups per molecule; (ii) a component (a) or (b) having a higher number of functional groups per molecule is present in a molar amount equal to or lower than a molar amount of the other component (a) or (b) having a lower number of functional groups per molecule; and (iii) unsaturated hydrocarbon compounds are excluded from the component mixture.

19 Claims, No Drawings

BRANCHED POLYSILOXANE COMPOSITION

BACKGROUND OF THE INVENTION

1. Field of the Invention

The invention relates to branched polysiloxane compositions of particular use as mist suppressants in silicone-based paper release coatings.

2. Description of the Prior Art

It is well known that in operations where silicone-based paper release coating formulations are subjected to a high enough rotational or translational motion, e.g., in high speed roll coating of flexible supports and paper, misting and/or aerosoling can become significant problems. These problems become particularly significant when applying these release coatings at roll coating speeds approaching 1000 ft/min, while the trend in the paper coating industry is to use speeds in excess of 1500 ft/min, e.g., 2000-3000 ft/min. In addition to having a deleterious effect on manufacturing operations, these mist and aerosol particles present industrial hygiene and safety issues for those people operating or working in the vicinity of the coating equipment.

Specialized chemical formulations known generically as "mist suppressants" have commonly been used to reduce the formation of mist in such operations. For example, U.S. Pat. Nos. 6,805,914 and 6,489,407 (hereinafter the '914 and '407 patents) disclose silicone mist suppressant compositions derived from reacting an excess of at least one organohydrogensilicone compound containing at least three silicon-bonded hydrogen groups per molecule (component (a)) with at least one compound containing at least two alkenyl groups per molecule (component (b)), wherein the ratio of the number of silicon-bonded hydrogen atoms of component (a) to the number of alkenyl groups of component (b) is at least 4.6:1, and more preferably from 4.6:1 to 500:1.

U.S. Pat. No. 6,586,535 discloses essentially the inverse of the '914 and '407 patents, i.e., silicone mist suppressant compositions derived from reacting at least one organohydrogensilicon compound containing at least two silicon-bonded hydrogen groups with an excess of at least one organoalkenylsiloxane compound containing at least three silicon-bonded alkenyl groups, wherein the ratio of the number of silicon-bonded hydrogen atoms of component (a) to the number of alkenyl groups of component (b) is less than or equal to 1:4.6, and preferably from 1:4.6 to 1:500.

U.S. Pat. Nos. 6,764,717 and 6,956,096 disclose silicone-based mist suppressant compositions derived from a two-step process involving: (a) reacting a hydrocarbon containing at least three aliphatic double bonds with a stoichiometric excess of organosiloxane compounds having terminal silicon-bonded hydrogen atoms, wherein the ratio of silicon-bonded hydrogen to aliphatic double bonds is from 1.3 to 10, and preferably from 1.5 to 5; and (b) reacting the resulting hydrocarbon-siloxane copolymers, which contain silicon-bonded hydrogen atoms, with a stoichiometric excess of α,ω-dialkenylsiloxane polymer, wherein the ratio of aliphatic double bonds in the α,ω-dialkenylsiloxane polymer to silicon-bonded hydrogen in the hydrocarbon-siloxane copolymer obtained in the first step is from 1.2 to 10, preferably from 1.5 to 5.0.

U.S. Pat. Nos. 6,887,949, 6,774,201, and 6,727,338 disclose silicone polymers as anti-mist additives wherein unsaturated hydrocarbon compounds are included in the synthesis of the silicone polymers.

U.S. Pat. No. 5,625,023 discloses mist suppressant compositions derived by reacting an organosilicon compound, an oxyalkylene-containing compound, and a catalyst.

U.S. Pat. No. 5,399,614 discloses adhesive compositions containing alkenyl-terminated polydiorganosiloxanes and silylhydride-terminated organohydrogenpolysiloxanes.

However, there remains a need for mist suppressant compositions which have at least the same or an improved capability of mist reduction while providing other benefits, such as cost savings, ease of production, ease of use, and/or broader application to a variety of end uses.

BRIEF DESCRIPTION OF THE INVENTION

These and other objectives have been achieved by providing a branched polysiloxane composition resulting from copolymerizing under hydrosilylation conditions a component mixture comprising:

(a) one or more organosilicon compounds containing at least two unsaturated hydrocarbon functional groups per molecule, said unsaturated hydrocarbon functional groups capable of undergoing a hydrosilylation reaction with a silylhydride-containing compound under hydrosilylation conditions; and (b) one or more silylhydride-containing compounds containing at least two silylhydride functional groups per molecule;

provided that (i) at least one component (a) or (b) contains at least three functional groups per molecule; (ii) when one component (a) or (b) has a higher number of functional groups per molecule than another component (a) or (b) having a lower number of functional groups per molecule, then the component (a) or (b) having a higher number of functional groups per molecule is present in a molar amount equal to or lower than the molar amount of the component (a) or (b) having a lower number of functional groups per molecule; and (iii) unsaturated hydrocarbon compounds are excluded from the component mixture.

In one embodiment, the unsaturated hydrocarbon functional groups of component (a) are in a molar ratio to silylhydride functional groups of component (b) within a range according to a formula (6−s):1 or 1:(1+t) where s represents a number equal to or greater than 0 and less than 5, and t represents a number greater than 0 and equal to or less than 5.

In another embodiment, the unsaturated hydrocarbon functional groups of component (a) are in a molar ratio to silylhydride functional groups of component (b) within a range according to a formula (4.6−s):1 or 1:(1+s) where s represents a number greater than 0 and less than 3.6.

In another embodiment, the unsaturated hydrocarbon functional groups of component (a) are in a molar ratio to silylhydride functional groups of component (b) within a range according to a formula (4.25−s):1 or 1:(1+t) where s represents a number equal to or greater than 0 and less than 3.25, and t represents a number greater than 0 and equal to or less than 3.25.

In yet another embodiment, the unsaturated hydrocarbon functional groups of component (a) are in a molar ratio to silylhydride functional groups of component (b) within a range of about 4.5:1 to about 2:1.

In particular embodiments, one component (a) or (b) has at least four, or at least six, or at least eight, or a higher number of functional groups per molecule, and is in a lower molar amount than the other component (a) or (b) having two or three functional groups per molecule.

The present invention advantageously provides novel branched polysiloxane compositions useful as mist suppressants. The branched polysiloxane compositions are capable of significant improvements in mist reduction while affording the additional benefits of being economical and simple to use and make.

DETAILED DESCRIPTION OF THE INVENTION

The branched polysiloxane compositions of the invention result from copolymerizing, under hydrosilylation reaction conditions, one or more organosilicon compounds containing at least two unsaturated hydrocarbon functional groups per molecule, i.e., component (a), with one or more silylhydride-containing compounds containing at least two silylhydride functional groups per molecule, i.e., component (b).

The organosilicon compound of component (a) includes any low molecular weight compound, as well as higher molecular weight oligomers and polymers, containing one or more silicon atoms and having at least two unsaturated hydrocarbon functional groups. Some examples of classes of organosilicon compounds of component (a) include organosilanes (i.e., containing silicon-carbon bonds in the absence of silicon-oxy bonds), siloxanes, and silazanes containing at least two unsaturated hydrocarbon groups.

The unsaturated hydrocarbon groups in the organosilicon compounds of component (a) include any straight-chained, branched, or cyclic hydrocarbon groups having at least one carbon-carbon double or triple bond capable of reacting with a silylhydride group under hydrosilylation conditions. More typically, the unsaturated hydrocarbon group contains two to six carbon atoms. Some examples of unsaturated hydrocarbon groups include substituted and unsubstituted vinyl, allyl, butenyl, butadienyl, 4-pentenyl, 2,4-pentadienyl, 5-hexenyl, cyclobutenyl, cyclohexenyl, acryloyl, and methacryloyl.

Some examples of low molecular weight organosilane compounds of component (a) include divinyldimethylsilane, divinyldichlorosilane, divinylmethylpropylsilane, divinyldipropylsilane, divinyldiisopropylsilane, divinyldiphenylsilane, divinylphenylpropylsilane, trivinylmethylsilane, trivinylethoxysilane, trivinylchlorosilane, trivinylphenylsilane, diallyldimethylsilane, diallyldichlorosilane, allylvinyldimethylsilane, trivinylphenylsilane, 1,3-divinyltetramethyldisilylmethane, 1,4-divinyltetramethyldisilylethane, 1,1-divinyltetramethyldisilylethane, 1,1,4-trivinyltrimethyldisilylethane, 1,1,1-trivinyltrimethyldisilylethane, 1,1,4,4-tetravinyldimethyldisilylethane, 1,1,1,4-tetravinyldimethyldisilylethane, 1,1,1,4,4,4-hexavinyldisilylethane, 1,3-divinyltetraphenyldisilylmethane, 1,4-divinyltetraphenyldisilylethane, 1,1-divinyltetraphenyldisilylethane, 1,1,4-trivinyltriphenyldisilylethane, 1,1,1-trivinyltriphenyldisilylethane, 1,1,4,4-tetravinyldiphenyldisilylethane, and 1,1,1,4-tetravinyldiphenyldisilylethane.

Some examples of low molecular weight siloxane compounds of component (a) include divinyldimethoxysilane, divinyldiethoxysilane, trivinylethoxysilane, diallyldiethoxysilane, triallylethoxysilane, vinyldimethylsiloxyvinyldimethylcarbinol ($CH_2{=}CH_2{-}C(CH_3)_2{-}O{-}Si(CH_3)_2(CH_2{=}CH_2)$), 1,3-divinyltetramethyldisiloxane, 1,3-divinyltetraethyldisiloxane, 1,1-divinyltetramethyldisiloxane, 1,1,3-trivinyltrimethyldisiloxane, 1,1,1-trivinyltrimethyldisiloxane, 1,1,3,3-tetravinyldimethyldisiloxane, 1,1,1,3-tetravinyldimethyldisiloxane, 1,3-divinyltetraphenyldisiloxane, 1,1-divinyltetraphenyldisiloxane, 1,1,3-trivinyltriphenyldisiloxane, 1,1,1-trivinyltriphenyldisiloxane, 1,1,3,3-tetravinyldiphenyldisiloxane, 1,1,1,3-tetravinyldiphenyldisiloxane, hexavinyldisiloxane, tris(vinyldimethylsiloxy)methylsilane, tris(vinyldimethylsiloxy)methoxysilane, tris(vinyldimethylsiloxy)phenylsilane, and tetrakis(vinyldimethylsiloxy)silane.

Some examples of linear siloxane oligomers of component (a) include 1,5-divinylhexamethyltrisiloxane, 1,3-divinylhexamethyltrisiloxane, 1,1-divinylhexamethyltrisiloxane, 3,3-divinylhexamethyltrisiloxane, 1,5-divinylhexaphenyltrisiloxane, 1,3-divinylhexaphenyltrisiloxane, 1,1-divinylhexaphenyltrisiloxane, 3,3-divinylhexaphenyltrisiloxane, 1,1,1-trivinylpentamethyltrisiloxane, 1,3,5-trivinylpentamethyltrisiloxane, 1,1,1-trivinylpentaphenyltrisiloxane, 1,3,5-trivinylpentaphenyltrisiloxane, 1,1,3,3-tetravinyltetramethyltrisiloxane, 1,1,5,5-tetravinyltetramethyltrisiloxane, 1,1,3,3-tetravinyltetraphenyltrisiloxane, 1,1,5,5-tetravinyltetraphenyltrisiloxane, 1,1,1,3,3-pentavinyltrimethyltrisiloxane, 1,1,3,5,5-pentavinyltrimethyltrisiloxane, 1,1,3,3,5,5-hexavinyldimethyltrisiloxane, 1,1,1,5,5,5-hexavinyldimethyltrisiloxane, 1,1,1,5,5,5-hexavinyldiphenyltrisiloxane, 1,1,1,5,5,5-hexavinyldimethoxytrisiloxane, 1,7-divinyloctamethyltetrasiloxane, 1,3,5,7-tetravinylhexamethyltetrasiloxane, and 1,1,7,7-tetravinylhexamethyltetrasiloxane.

Some examples of cyclic siloxane oligomers of component (a) include 1,3-divinyltetramethylcyclotrisiloxane, 1,3,5-trivinyltrimethylcyclotrisiloxane, 1,3-divinyltetraphenylcyclotrisiloxane, 1,3,5-trivinyltriphenylcyclotrisiloxane, 1,3-divinylhexamethylcyclotetrasiloxane, 1,3,5-trivinylpentamethylcyclotetrasiloxane, and 1,3,5,7-tetravinyltetramethylcyclotetrasiloxane.

Some examples of silazanes of component (a) include 1,3-divinyltetramethyldisilazane, 1,3-divinyl-1,3-diphenyl-1,3-dimethyldisilazane, 1,3,5-trivinyltrimethylcyclotrisilazane, 1,3,5-trivinyltriphenylcyclotrisilazane, 1,3,5-trivinylpentamethylcyclotetrasilazane, and 1,3,5,7-tetravinyltetramethylcyclotetrasilazane.

The polymeric siloxanes (polysiloxanes) of component (a) include any of the linear, branched, and/or crosslinked polymers having any two or more of a combination of M, D, T, and Q groups, wherein, as known in the art, an M group represents a monofunctional group of formula $R_3SiO_{1/2}$, a D group represents a bifunctional group of formula $R_2SiO_{2/2}$, a T group represents a trifunctional group of formula $RSiO_{3/2}$, and a Q group represents a tetrafunctional group of formula $SiO_{4/2}$, and wherein at least two of the R groups are unsaturated hydrocarbon groups and the remainder of the R groups can be any suitable groups including hydrocarbon (e.g., $C_1$-$C_6$), halogen, alkoxy, and/or amino groups.

Some examples of classes of polysiloxanes suitable for component (a) include the MDM, TD, MT, MDT, MDTQ, MQ, MDQ, and MTQ classes of polysiloxanes, and combinations thereof, having at least two unsaturated hydrocarbon groups.

In a particular embodiment, component (a) is an MD-type of polysiloxane having one or more M and/or $M^{vi}$ groups in combination with one or more D and/or $D^{vi}$ groups, wherein M represents $Si(CH_3)_3O—$, $M^{vi}$ represents $(CH_2{=}CH_2)Si(CH_3)_2O—$, D represents $—Si(CH_3)_2O—$, and $D^{vi}$ represents —$Si(CH_2{=}CH_2)(CH_3)O$—, "vi" is an abbreviation for "vinyl," and wherein the MD-type of polysiloxane contains at least two vinyl groups.

Some examples of suitable MD-type polysiloxanes for component (a) include the $M^{vi}D_nM^{vi}$, $M^{vi}D^{vi}_nM$, $M^{vi}D^{vi}_nD_mM$, $M^{vi}D^{vi}_nM^{vi}$, $M^{vi}D^{vi}_nD_mM^{vi}$, $MD^{vi}_nM$, and $MD^{vi}_nD_mM$ classes of MD-type polysiloxanes, wherein m and n each represent at least 1. Any one or combination of the foregoing types of MD polysiloxanes can be used for component (a). In various embodiments, m and n can independently represent, for example, a number within the ranges 1-10, 11-20, 50-100, 101-200, 201-500, 501-1500, and higher numbers.

The $D^{vi}$ groups can also be randomly incorporated (i.e., not as a block) amongst D groups. For example, $M^{vi}D^{vi}_nD_mM$ can represent a polymer wherein n represents 5-20 and m represents 50-1500, and wherein the 5-20 $D^{vi}$ groups are randomly incorporated amongst the 50-1500 D groups.

In other embodiments, the $M^{vi}$ and $D^{vi}$ groups can each independently include a higher number of unsaturated functional groups, such as, for example, $(CH_2{=}CH_2)_2(CH_3)SiO$— and $(CH_2{=}CH_2)_3SiO$— groups for $M^{vi}$ or —$Si(CH_2{=}CH_2)_2O$— for $D^{vi}$.

The one or more silylhydride-containing compounds of component (b) includes any low molecular weight compound, oligomer, or polymer containing at least two silylhydride functional groups per molecule. Some examples of classes of silylhydride-containing compounds of component (b) include organosilanes, siloxanes, and silazanes containing at least two silylhydride functional groups.

Some examples of low molecular weight compounds of component (b) include dimethylsilane, diethylsilane, di-(n-propyl)silane, diisopropylsilane, diphenylsilane, methylchlorosilane, dichlorosilane, 1,3-disilapropane, 1,3-disilabutane, 1,4-disilabutane, 1,3-disilapentane, 1,4-disilapentane, 1,5-disilapentane, 1,6-disilahexane, bis-1,2-(dimethylsilyl)ethane, bis-1,3-(dimethylsilyl)propane, 1,2,3-trisilylpropane, 1,4-disilylbenzene, 1,2-dimethyldisilane, 1,1,2,2-tetramethyldisilane, 1,2-diphenyldisilane, 1,1,2,2-tetraphenyldisilane, 1,1,3,3-tetramethyldisiloxane, 1,1,3,3-tetraphenyldisiloxane, 1,1,3,3,5,5-hexamethyltrisiloxane, 1,1,1,5,5,5-hexamethyltrisiloxane, 1,3,5-trimethylcyclotrisiloxane, 1,3,5,7-tetramethylcyclotetrasiloxane, and 1,3,5,7-tetraphenylcyclotetrasiloxane.

Some examples of silylhydride-containing silazanes of component (b) include 1,1,3,3-tetramethyldisilazane, 1,3,5-triethyl-2,4,6-trimethylcyclotrisilazane, 1,2,3,4,5,6-hexamethylcyclotrisilazane, and 1,2,3,4,5,6,7,8-octamethylcyclotetrasilazane.

Some examples of silylhydride-containing oligomers and polymers of component (b) include any of the linear, branched, and/or crosslinked polymers having any two or more of a combination of M, D, T, and Q groups, as described above, and having at least two silylhydride functional groups in the oligomer or polymer.

In a particular embodiment, component (b) is an MD-type of polysiloxane having one or more M and/or $M^H$ groups in combination with one or more D and/or $D^H$ groups, wherein M represents $Si(CH_3)_3O$—, $M^H$ represents $HSi(CH_3)_2O$—, D represents —$Si(CH_3)_2O$—, and $D^H$ represents —$Si(H)(CH_3)O$—, and wherein the MD-type of polysiloxane contains at least two silylhydride groups.

Some examples of suitable MD-type polysiloxanes for component (b) include the $M^HD_nM^H$, $M^HD^H_nM$, $M^HD^H_nD_mM$, $M^HD^H_nM^H$, $M^HD^H_nD_mM^H$, $MD^H_nM$, and $MD^H_nD_mM$ classes of MD-type polysiloxanes, and combinations thereof, wherein m and n each represent at least 1 and can have any of the numerical values as described above.

The $D^H$ groups can also be randomly incorporated (i.e., not as a block) amongst D groups. For example, $M^HD^H_nD_mM$ can represent a polymer wherein n represents 5-20 and m represents 50-1500, and wherein the 5-20 $D^H$ groups are randomly incorporated amongst the 50-1500 D groups.

In other embodiments, $M^H$ and $D^H$ groups can independently have a higher number of silylhydride functional groups, such as, for example, $H_2Si(CH_3)O$— and $H_3SiO$— groups for $M^H$ or —$Si(H)_2O$— for $D^H$.

According to the invention, at least one component (a) or (b) contains at least three functional groups per molecule. For example, one of component (a) or (b) can have three functional groups per molecule while the other component (a) or (b) contains two functional groups per molecule; or both component (a) and (b) can each contain three functional groups per molecule; or one of component (a) or (b) can have three functional groups per molecule while the other component (a) or (b) contains four functional groups per molecule; or both component (a) and (b) can each contain four functional groups per molecule; and so on.

In one embodiment, components (a) and (b) contain an equal number of functional groups and are in any molar ratio with respect to each other, including equal or similar molar amounts. In another embodiment, one of component (a) or (b) contains a higher number of functional groups than the other component (a) or (b) and both components are in equal molar amounts.

In another embodiment, the branched polysiloxane follows a branching pattern similar to a star polymer wherein molecules of either component (a) or (b) having a higher number of functional groups (i.e., crosslinkers) are in a lower molar amount than molecules of either component (a) or (b) having a lower number of functional groups (i.e., extenders). The above-described star polymer pattern is distinct from a dendritic pattern in which branching predominates.

For example, one component (a) or (b) can have at least four, five, six, seven, eight, nine, ten, or a higher number of functional groups and be in a lower molar amount than another component (a) or (b) containing two or three functional groups per molecule.

The unsaturated hydrocarbon functional groups of component (a) can be in any suitable molar ratio to silylhydride functional groups of component (b), e.g., 100:1, 50:1, 25:1, 20:1, 10:1, 1:10, 1:20, 1:25, 1:50, 1:100, and any range of ratios therebetween.

In a particular embodiment, the unsaturated hydrocarbon functional groups of component (a) are in a molar ratio to silylhydride functional groups of component (b) within a range according to the formula $(6-s):1$ or $1:(1+t)$ wherein s represents a number equal to or greater than 0 and less than 5, and t represents a number greater than 0 and equal to or less than 5. Some examples of such molar ratios of functional groups of (a) to functional groups of (b) include 6:1, 5.5:1, 5:1, 4.5:1, 4:1, 3.5:1, 3:1, 2.5:1, 2:1, 1.5:1, 1.4:1, 1.2:1, 1:1.2, 1:1.4, 1:1.5, 1:2, 1:2.5, 1:3, 1:3.5, 1:4, 1:4.5, 1:5, 1:5.5, and 1:6, and any range of ratios therebetween.

For example, in one embodiment, the unsaturated hydrocarbon functional groups of component (a) are in a molar ratio to silylhydride functional groups of component (b) within a range according to the formula $(4.6-s):1$ or $1:(1+s)$ wherein s represents a number greater than 0 and less than 3.6. In another embodiment, the unsaturated hydrocarbon functional groups of component (a) are in a molar ratio to silylhydride functional groups of component (b) within a range according to the formula $(4.25-s):1$ or $1:(1+t)$ wherein s represents a number equal to or greater than 0 and less than 3.25, and t represents a number greater than 0 and equal to or less than 3.25. In yet another embodiment, the unsaturated hydrocarbon functional groups of component (a) are in a molar ratio to silylhydride functional groups of component (b) within a range of about 4.5:1 to about 2:1.

The viscosity of the branched polysiloxane is typically greater than 1,500 centipoise (cPs), where 1 cPs=1 millipascal-second (mPa·s). More typically, the viscosity of the branched polysiloxane is about or greater than 3,000 cPs, and even more typically about 5,000 cPs. In other embodiments, the viscosity of the branched polysiloxane can be about or greater than 10,000 cPs, 25,000 cPs, 50,000 cPs, or a higher viscosity.

In one embodiment, tetravalent $SiO_{4/2}$ groups (i.e., Q groups) are excluded from the branched polysiloxane composition.

In another embodiment, unsaturated hydrocarbon compounds, such as, e.g., alpha-olefins, are excluded from the component mixture from which the branched polysiloxane is derived. Some examples of such unsaturated hydrocarbon compounds include alpha-olefins of the formula $CH_2{=}CHR^1$ wherein $R^1$ is selected from halogen, hydrogen, or a heteroatom-substituted or unsubstituted hydrocarbon group having one to sixty carbon atoms. Some heteroatoms include oxygen (O) and nitrogen (N) atoms.

In yet another embodiment, oxy-substituted hydrocarbon compounds, such as oxyalkylene-containing and/or ester-containing saturated or unsaturated compounds, are excluded from the branched polysiloxane composition.

The branched polysiloxane results from the copolymerization of component (a) and component (b) under hydrosilylation conditions. By "hydrosilylation conditions" is meant the conditions known in the art for hydrosilylation crosslinking between compounds containing unsaturated groups and compounds containing silylhydride groups.

As known in the art, a hydrosilylation catalyst is required to promote or effect the hydrosilylation reaction between components (a) and (b) either during or after mixing of the components at a suitable temperature. The hydrosilylation catalyst typically contains one or more platinum-group metals or metal complexes. For example, the hydrosilylation catalyst can be a metallic or complexed form of ruthenium, rhodium, palladium, osmium, iridium, or platinum. More typically, the hydrosilylation catalyst is platinum-based. The platinum-based catalyst can be, for example, platinum metal, platinum metal deposited on a carrier (e.g., silica, titania, zirconia, or carbon), chloroplatinic acid, or a platinum complex wherein platinum is complexed to a weakly binding ligand such as divinyltetramethyldisiloxane. The platinum catalyst can be included in a concentration range of, for example, 1-100 ppm, but is more typically included in a concentration of about 5 to 40 ppm.

Auxiliary and other components can be included, as necessary, to the component mixture for making the branched polysiloxane. Some types of auxiliary components include catalyst inhibitors, surfactants, and diluents. Some examples of catalyst inhibitors include maleates, fumarates, unsaturated amides, acetylenic compounds, unsaturated isocyanates, unsaturated hydrocarbon diesters, hydroperoxides, nitriles, and diaziridines. Some examples of diluents include the hydrocarbons (e.g., pentanes, hexanes, heptanes, octanes), aromatic hydrocarbons (e.g., benzene, toluene, and the xylenes), ketones (e.g., acetone, methylethylketone), and halogenated hydrocarbons (e.g., trichloroethene and perchloroethylene).

Examples have been set forth below for the purpose of illustration. The scope of the invention is not to be in any way limited by the examples set forth herein.

EXAMPLE 1

Synthesis of Branched Polysiloxane Composition

In this example, the component referred to as Component A is a commercially available difunctional vinyl-terminated polysiloxane of the formula $M^{vi}D_{110}M^{vi}$ having a viscosity of 200-300 cPs. The component referred to as Component B is a commercially available hexafunctional silylhydride-containing polysiloxane of the formula $MD_{500}D^{H}_{6.5}M$ having a viscosity of 6,000 to 15,000 cPs and hydride content of 155 to 180 ppm, where 6.5 represents an average number of $D^H$ groups randomly incorporated amongst D groups. The component referred to as Component C is a commercially available catalyst formulation containing 10% by weight platinum.

To a 1 L reactor equipped with an overhead stirrer, GN2 inlet, thermometer, and oil bath was added 168.7 g (ca. 20.2 mmol) of Component A, and ca. 0.05 g of Component C. The mixture was agitated for one hour under ambient conditions. Next, 54.4 g (ca. 1.4 mmol) of Component B was separately cooled to 4° C. and then added to the components above with stirring. The mixture was agitated for 15 minutes under ambient conditions and then slowly heated to 90° C. After 30 minutes, some gelling was observed. To the reaction mixture was added 255.5 g of Component A at 90° C. The mixture was stirred for two hours at 90° C., cooled to room temperature (~25° C.), and discharged from the kettle. The amount of product was 430.9 g, which corresponds to a 90% yield. The shear viscosity and shear modulus were measured at 12 Hz to be 2.813 Pa·s and 201.2 Pa, respectively.

Thus, whereas there have been described what are presently believed to be the preferred embodiments of the present invention, those skilled in the art will realize that other and further embodiments can be made without departing from the spirit of the invention, and it is intended to include all such further modifications and changes as come within the true scope of the claims set forth herein.

The invention claimed is:

1. A branched polysiloxane composition resulting from copolymerizing under hydrosilylation conditions a component mixture comprising:

(a) one or more organosilicon compounds containing at least two unsaturated hydrocarbon functional groups per molecule, said unsaturated hydrocarbon functional groups capable of undergoing a hydrosilylation reaction with a silylhydride-containing compound under hydrosilylation conditions, provided that when said component (a) is a polysiloxane, it contains at least one D or T silicone unit that contains at least one unsaturated hydrocarbon functional group; and (b) one or more silylhydride-containing compounds containing at least two silylhydride functional groups per molecule;

provided that (i) at least one component (a) or (b) contains at least three functional groups per molecule; (ii) one component (a) or (b) has a higher number of functional groups per molecule and is in a lower molar amount than another component (a) or (b) having a lower number of functional groups per molecule; and (iii) unsaturated hydrocarbon compounds are excluded from the component mixture.

2. The composition of claim 1, wherein the unsaturated hydrocarbon functional groups of component (a) are in a molar ratio to silylhydride functional groups of component (b) within a range according to a formula (4.25−s):1 or 1:(1+t)

where s represents a number equal to or greater than 0 and less than 3.25, and t represents a number greater than 0 and equal to or less than 3.25.

3. The composition of claim 1, wherein the unsaturated hydrocarbon functional groups of component (a) are in a molar ratio to silylhydride functional groups of component (b) within a range according to a formula (4.6−s):1 where s represents a number greater than 0 and less than 3.6.

4. The composition of claim 1, wherein the unsaturated hydrocarbon functional groups of component (a) are in a molar ratio to silylhydride functional groups of component (b) within a range of about 4.5:1 to about 2:1.

5. The composition of claim 1, wherein one component (a) or (b) has at least four functional groups per molecule and is in a lower molar amount than the other component (a) or (b) having two or three functional groups per molecule.

6. The composition of claim 1, wherein one component (a) or (b) has at least six functional groups per molecule and is in a lower molar amount than the other component (a) or (b) having two or three functional groups per molecule.

7. A branched polysiloxane composition resulting from copolymerizing under hydrosilylation conditions a component mixture comprising:

(a) one or more organosilicon compounds containing at least two unsaturated hydrocarbon functional groups per molecule, said unsaturated hydrocarbon functional groups capable of undergoing a hydrosilylation reaction with a silylhydride-containing compound under hydrosilylation conditions, provided that when said component (a) is a polysiloxane, it contains at least one D or T silicone unit that contains at least one unsaturated hydrocarbon functional group; and (b) one or more silylhydride-containing compounds containing at least two silylhydride functional groups per molecule;

provided that (i) at least one component (a) or (b) contains at least three functional groups per molecule; (ii) unsaturated hydrocarbon functional groups of component (a) are in a molar ratio to silylhydride functional groups of component (b) within a range of about (6−s):1 or about 1:(1+t) where s represents a number equal to or greater than 0 and less than 5, and t represents a number greater than 0 and equal to or less than 5; (iii) one component (a) or (b) has a higher number of functional groups per molecule and is in a lower molar amount than another component (a) or (b) having a lower number of functional groups per molecule; (iv) unsaturated hydrocarbon compounds are excluded from the component mixture.

8. The composition of claim 7, wherein the unsaturated hydrocarbon functional groups of component (a) are in a molar ratio to silylhydride functional groups of component (b) within a range according to a formula (4.6−s):1 or 1:(1+s) where s represents a number greater than 0 and less than 3.6.

9. The composition of claim 7, wherein the unsaturated hydrocarbon functional groups of component (a) are in a molar ratio to silylhydride functional groups of component (b) within a range according to a formula (4.25−s):1 or 1:(1+t) where s represents a number equal to or greater than 0 and less than 3.25, and t represents a number greater than 0 and equal to or less than 3.25.

10. The composition of claim 7, wherein the unsaturated hydrocarbon functional groups of component (a) are in a molar ratio to silylhydride functional groups of component (b) within a range according to a formula (4.6−s):1 where s represents a number greater than 0 and less than 3.6.

11. The composition of claim 7, wherein the unsaturated hydrocarbon functional groups of component (a) are in a molar ratio to silylhydride functional groups of component (b) within a range of about 4.5:1 to about 2:1.

12. The composition of claim 7, wherein one component (a) or (b) has at least four functional groups per molecule and is in a lower molar amount than the other component (a) or (b) having a two or three functional groups per molecule.

13. The composition of claim 7, wherein one component (a) or (b) has at least six functional groups per molecule and is in a lower molar amount than the other component (a) or (b) having two or three functional groups per molecule.

14. A branched polysiloxane composition resulting from copolymerizing under hydrosilylation conditions a component mixture comprising:

(a) one or more organosilicon compounds containing at least two unsaturated hydrocarbon functional groups per molecule, said unsaturated hydrocarbon functional groups capable of undergoing a hydrosilylation reaction with a silylhydride-containing compound under hydrosilylation conditions, provided that when said component (a) is a polysiloxane, it contains at least one D or T silicone unit that contains at least one unsaturated hydrocarbon functional group; and (b) one or more silylhydride-containing compounds containing at least two silylhydride functional groups per molecule;

provided that (i) at least one component (a) or (b) contains at least three functional groups per molecule; (ii) unsaturated hydrocarbon functional groups of component (a) are in a molar ratio to silylhydride functional groups of component (b) within a range according to a formula (4.6−s):1 or 1:(1+s) where s represents a number greater than 0 and less than 3.6; (iii) one component (a) or (b) has a higher number of functional groups per molecule and is in a lower molar amount than another component (a) or (b) having a lower number of functional groups per molecule; (iv) unsaturated hydrocarbon compounds are excluded from the component mixture.

15. The composition of claim 14, wherein the unsaturated hydrocarbon functional groups of component (a) are in a molar ratio to silylhydride functional groups of component (b) within a range according to a formula (4.25−s):1 or 1:(1+t) where s represents a number equal to or greater than 0 and less than 3.25, and t represents a number greater than 0 and equal to or less than 3.25.

16. The composition of claim 14, wherein the unsaturated hydrocarbon functional groups of component (a) are in a molar ratio to silylhydride functional groups of component (b) within a range according to a formula (4.6−s):1 where s represents a number greater than 0 and less than 3.6.

17. The composition of claim 14, wherein the unsaturated hydrocarbon functional groups of component (a) are in a molar ratio to silylhydride functional groups of component (b) within a range of about 4.5:1 to about 2:1.

18. The composition of claim 7, wherein one component (a) or (b) has at least four functional groups per molecule and is in a lower molar amount than the other component (a) or (b) having two or three functional groups per molecule.

19. The composition of claim 14, wherein one component (a) or (b) has at least six functional groups per molecule and is in a lower molar amount than the other component (a) or (b) having two or three functional groups per molecule.

* * * * *